Figure 1:
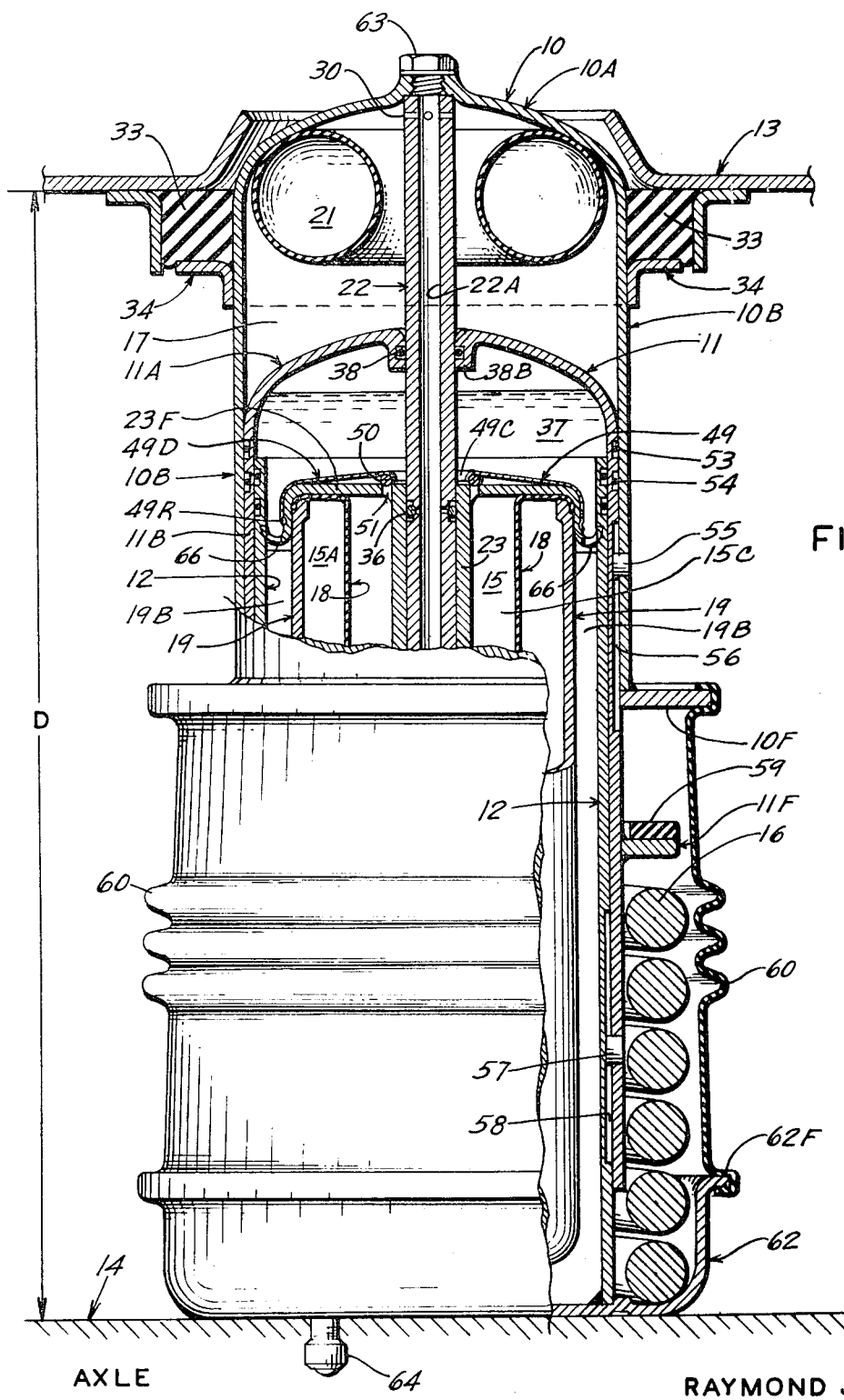

United States Patent

[11] 3,632,130

[72] Inventor Raymond J. Novotny
 Sparta, N.J.
[21] Appl. No. 49,830
[22] Filed June 25, 1970
[45] Patented Jan. 4, 1972
[73] Assignee Abex Corporation
 New York, N.Y.

[54] VEHICLE SUSPENSIONS
 7 Claims, 2 Drawing Figs.
[52] U.S. Cl. .................................................. 280/124,
 267/64
[51] Int. Cl. ..................................................... B60g 17/08
[50] Field of Search ........................................... 267/64 R,
 64 A, 64 B, 34; 280/124 F

[56] References Cited
UNITED STATES PATENTS
3,389,903 6/1968 Schmid .......................... 267/64

3,306,599 2/1967 Allinquant ..................... 267/64 B

*Primary Examiner*—Philip Goodman
*Attorney*—Kinzer, Dorn & Zickert

ABSTRACT: A vehicle suspension unit of the shock-absorber-type with combined self-pumping, load-leveling capability. Includes a piston within a cylinder but separated by an air spring in a chamber therebetween, the piston in turn being supported by a second spring, the cylinder and second spring being confined between an axle and the vehicle chassis. In the event of a severe load, liquid from an accumulator is transmitted to the chamber between the cylinder and piston, restoring the cylinder and chassis to the normal level. Liquid is thus transmitted through the bore of a hollow rod which is connected to the cylinder, there being porting between the accumulator and rod allowing this only under severe load conditions; and preferably the rod has a piston, operating in a pump chamber of unusual form, for keeping the accumulator chamber charged with liquid.

INVENTOR.
RAYMOND J. NOVOTNY
BY
Kinzer Dorn and Zickert
ATTORNEYS

INVENTOR.
RAYMOND J. NOVOTNY

VEHICLE SUSPENSIONS

This invention relates to a suspension unit of the shock absorbing type to be interposed between the chassis and axle of a vehicle, embodying a cooperating air and mechanical spring for static and dynamic loads and an accumulator for restoring the chassis to normal position due to static loading.

It is to be understood that in nearly all instances a severe dynamic load on the chassis in reality will be that occasioned by operation of the spring system of the vehicle as a whole.

The primary object of the invention is to normally support the vehicle chassis under static conditions by means of a combined air and mechanical spring but so arranged in association with an accumulator that when a static load on the chassis depresses the chassis substantially below curb height or the normal running level above the road surface, fluid under pressure in the accumulator is effective to return the chassis to its normal position.

An object of the invention relating to the foregoing is to utilize a main or top cylinder (surrounding a piston) as a support for a hollow rod having a manifold and passage means therein for transferring fluid under pressure from an accumulator to a chamber afforded between opposed end walls of the cylinder and the piston, whereby the fluid thus transferred acts between said end walls to in effect return the chassis to its normal running position; and another related object is to use the same rod as a pump for recharging the accumulator with makeup fluid obtained from an oil reservoir concentrically related to the accumulator.

Another object of the invention is to so construct the suspension unit as to present a combined air spring and mechanical spring effective normally to provide ordinary shock absorbing capabilities between the chassis and axle, and in such a fashion as to provide an increase in the spring rate accordingly as the load increases.

Still another object of the invention is to so combine a cylinder (joined to the chassis) and piston as to present spaced, opposed end walls defining a chamber for an air spring of an unusual interposed relationship, normally effective to absorb minimal shocks in cooperation with a coil spring supporting the piston on the vehicle axle, and associated with an accumulator in such a way that in the event the concurrent travel of the cylinder and piston exceeds a predetermined distance under sever downward loading, a coaxially associated accumulator is effective to furnish hydraulic fluid under pressure to the aforesaid chamber raising the cylinder independently of the piston and tending to restore the chassis to curb height.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention.

Figure 2:
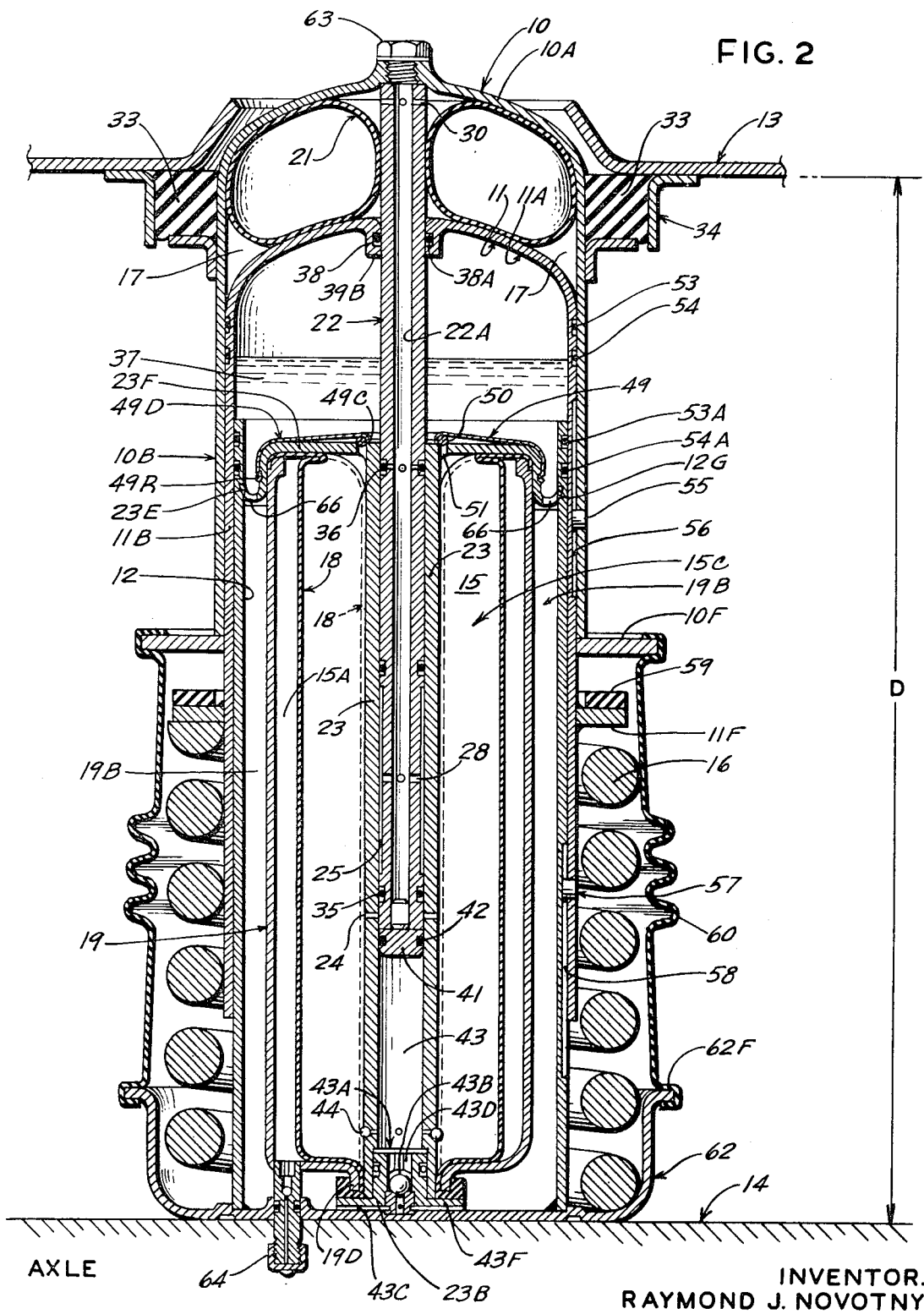

In the drawings:

FIG. 1 is an elevation, partly is section, showing the present suspension unit in its restored state, following static loading; and FIG. 2 is a sectional view of the unit in its normal state of operation.

The shock absorbing or suspension device, FIG. 1, considered in terms of an upright position, includes a top cylinder 10, a piston 11 of tubular form telescoped therein and a bottom cylinder 12 of tubular form in turn telescoped within the piston, the assembly being arranged between the chassis 13 of the vehicle and an axle 14 thereof. The cylinder 12 in effect is a guide for the piston and a support for the unit as a whole as will be appreciated from the disclosure to follow.

An accumulator 15, to be described in more detail hereinafter, is arranged within the bottom cylinder 12. A large coil spring 16 is arranged concentrically about the skirt or sidewall of the piston 11, the latter being provided with an external flange 11F engaging the top coil of the spring. The bottom of the spring in effect reacts on the axle 14.

The top cylinder 10 is characterized by an end wall 10A and a dependent tubular sidewall 10B. In like manner the piston is characterized by a tubular sidewall 11B having a sealed, sliding fit about the inside diameter of the sidewall 10B of the cylinder 10, and also includes an end wall 11A spaced substantially below the end wall 10A of the cylinder 10. The spacing thus afforded between the spaced end walls of the cylinder and the piston defines a closed chamber 17 in which is located a gas bag of torus form, as hereinafter described, serving as a spring or cushion between the opposed end walls of the cylinder and piston.

The accumulator 15 is defined in part by a movable outer wall presented by a flexible boot 18 of sleevelike form located inward of the inner cylinder 12. The boot 18 flexes between a compressed state (solid line, FIG. 2) and an expanded state (dotted line, FIG. 2).

A large diameter tube 19 surrounds the flexible wall 18 of the accumulator and is concentrically related to the inside diameter of the cylinder 12, being disposed in spaced relation inward thereof to afford an annular oil reservoir 19B. A body of gas under pressure is contained in the annular chamber 15A afforded by the spacing between the tube 19 and the flexible wall 18 of the accumulator, thereby pressurizing the contained volume in the annular chamber 15C of the accumulator 15.

FIG. 2 shows the normal or unloaded state of the device, and referring to FIG. 2, the chamber 17 between the end walls of the cylinder 10 and the piston 11 is occupied by a toroidal gas bag 21. When a load is applied to the chassis 13 effective to move the top cylinder 10 downward, such movement tends to decrease the volume of chamber 17, compressing the gas bag 21. As a result, the piston 11 also moves downward against the resistance of the coil spring 16. During the compression of the gas bag 21 the characteristic of the contained volume of gas within the gas bag 21 is sufficiently altered to substantially increase its effective spring constant or stiffness, and this constant is reflected in the operation of the suspension unit. In the limit circumstance, the combined spring constant of the air spring and the mechanical spring 16 tend toward the spring constant of the latter which is stiffer than the combined two spring means. Thus, under static load the suspension unit provides increased spring stiffness with an increase in static load.

Referring to FIG. 2, the effect of a load will now be considered with respect to rod 22 which is radially inward of the accumulator 15. The rod 22 is hollow, having a bore 22A. This bore is closed at its lower end, as described in more detail below, but is in communication with the chamber 17 at its upper end as hereinafter described.

The rod 22 at its upper end is fixedly attached to the interior surface of the top wall 10A of the cylinder 10 and extends downward therefrom in a coaxial relation, being movable along the inside diameter of a rigid tube 23 constituting the inflexible interior wall of the accumulator 15. The tube 23, FIG. 2, is rigidly supported at its lower end on a boss 23B constituting a housing for a check valve assembly as hereinafter described.

The inflexible wall 23 of the accumulator 15 is provided with a transfer passage 24, FIG. 2, enabling hydraulic fluid under pressure within the accumulator chamber to pass therefrom, the accumulator chamber being the contained volume in the annular chamber 15C between the two accumulator walls 18 and 23. The accumulator is pressurized as above explained by the gas under pressure in the outer gas chamber 15A.

The outer surface of the rod 22 is recessed in part to provide a manifold 25. The manifold 25 is normally not in communication with the transfer passage 24, but rather is displaced upward therefrom by a predetermined distance. However, when this distance is traversed as an incident to loading, causing the cylinder 10 and rod 22 to move downward, oil under pressure in the accumulator moves from the transfer passage 24 to the manifold 25, and from thence through an entrance orifice 28 into the bore 22A of the rod 22.

An exit orifice 30 is formed in the upper end of the rod bore 22A, thereby communicating the rod bore or passage 22A with the chamber 17. Hence when the accumulator transfer passage 24 and the rod manifold 25 are in registry or in communication, fluid under pressure flows from the accumulator chamber into chamber 17 surrounding the gas bag 21, noting that bore 22A of the rod and chamber 17 are normally filled with oil or other hydraulic fluid.

The increasing volume of oil transmitted to chamber 17 from the accumulator increases the presence in chamber 17, tending to contract the volume occupied by the gas bag 21, and soon forces cylinder 10 upward independently with respect to the piston 11. Upward or return movement of the cylinder 10 also moves the chassis 13 upward toward its curb height limit.

A snubber 33 is interposed between the vehicle chassis 13 and a snubber support flange 34 fixed to the side wall 10B of the cylinder 10. Upward or return movement of the chassis 13 will cease when the accumulator transfer passage 24 once more is closed by return movement of the lower end of rod 22 in cooperation with an O-ring seal 35, noting again that the lower end of the rod bore 22A is closed.

When static load is reduced the tendency to return the chassis 13 to a greater distance than curb height will be characterized by oil under pressure in chamber 17 flowing back through the exit orifice 30, down passage 22A and through a pump rod curb height position relief valve 36 (O-ring type) into the upper oil reservoir 37. This is especially true when the static load is completely removed from the chassis 13.

An O-ring seal 38 seals the high pressure gas compression chamber 17 from the low pressure upper oil reservoir 37, the O-ring 38 encompassing rod 22 and being disposed in a seat 38A presented by a boss 39B depending from the upper wall 11A of the piston 11. As shown in FIG. 2, the boss 39B also affords an aperture through which rod 22 extends.

The relief valve 36 presented in the periphery of rod 22 is of the O-ring type as noted and is normally sealed or closed by virtue of being located in an intermediate portion of rod 22 opposite the accumulator tube 23 at a position spaced below the upper end of the tube 23.

Hydraulic fluid used in the device is stored in the accumulator chamber 15C, the upper oil reservoir 37 and the lateral or side oil reservoir 19B. Reservoirs 37 and 19B are in communication with one another in the manner explained hereinafter. The device embodies a self-pumping feature for recharging the accumulator as will now be explained.

A piston head 41 is secured to the lower end of rod 22, closing the lower end of the bore or transfer passage 22A therein. An O-ring seal 42 is fitted to the piston head 41, assuring a sealed relationship between the piston and the bore presented by the accumulator tube 23, noting that the piston 41 is normally displaced a considerable distance upward within a pump chamber 43 presented by the bore of the tube 23 therebelow. Upon upward relative motion of rod 22 as viewed in FIG. 2, oil is drawn from the bottom of chamber 19B into the accumulator pump chamber 43 through a bottom check valve assembly 43A including a check ball 43B, a passage 43C in communication with the reservoir 19B and a check ball valve chamber 43D which in turn communicates with the pump chamber 43.

On the other hand, downward motion of rod 22, in a pump sense, is characterized by the piston head 41 forcing oil out of the pump chamber 43 and through an inlet check valve 44 (O-ring type) type) leading to the chamber 15C of the accumulator.

The flexible boot or wall 18 of the accumulator is sealed at the upper end by virtue of being clamped between the upper edge of tube 19 and the opposed surface of a top flange 23F extended outward from the upper end of the tube 23. In this connection it should be pointed out that the outer periphery of flange 23F is springlike in nature and is provided with a circular upturned edge 23E adapted to snap into a corresponding groove 12G formed about the inside diameter of cylinder 12. At the bottom, the accumulator sleeve 18 is clamped between a collar 19D of reduced diameter formed at the bottom of cylinder 19 and a flanged portion 43F on the boss 23B which presents the bottom of check valve assembly 43A.

An accumulator relief valve assembly 49 is flexibly secured to the top portion of the accumulator sleeve or tube 23 to prevent buildup of excessive pressure within the accumulator chamber 15C. The relief valve assembly 49 is characterized by a flexible disc 49D having an outer rim with a dependent rib 49R snap-fitted in a corresponding groove in the outer side wall of the flange 23F of the accumulator tube 23. An O-ring 50 is fitted to a collar 49C at the inner diameter of flexible disc 49D and normally covers a plurality of passages 51 in the flange 23F which afford communication between the accumulator chamber 15C and the oil reservoir 37. Thus in the event that an excessive amount of makeup oil is pumped to the accumulator chamber 15C in the course of downward movement of the piston head 41, such excess is effective to open the relief valve 49, permitting passage thereof into the oil reservoir 37.

An oil ring seal 53 and a scraper seal 54 provide dynamic sealing between the top cylinder 10 and the piston 11. In like manner, an O-ring seal 53A and a scraper seal 54A are provided between the opposed surfaces of the piston 11 and the cylinder 12.

Limited constraint of relative movement between cylinder 10 and piston 11 is afforded by an upper location key 55 in cooperation with a key slot 56. Key 55 is seated in the sidewall of piston 10, and the key slot 56 is formed in the outer surface of the side wall of piston 11. Similarly, limited constraint of relative motion of the piston 11 with respect to the cylinder 12 is achieved by a lower location key 57, secured to the side wall of the piston 11, and presented to a lower key slot 58 formed in the outer wall of cylinder 12.

The upper surface of the flange 11F is faced with a cushion 59 which prevents direct metal-to-metal contact between the opposed flanges 10F and 11F in the event that the gas bag 21 should collapse due to leakage.

Advantageously an external sleeve or boot 60 is employed to prevent contamination of the moving surfaces. The boot has an upper circular end clamped to a circular flange 10F projecting outward from the lower edge of the side wall the upper cylinder 10, and the boot at its lower end is similarly snapped to the upper flange 62F of a bottom cup 62 which reposes on the vehicle axle 14 with the rim thereof surrounding the receiving the lower end of the coil spring 16 and the lower end of cylinder 12 which is welded thereto.

Loading of the unit with hydraulic fluid is accomplished with an oil fill screw 63 located in the top wall of the cylinder 10. The chamber 15A for pressurizing the accumulator is initially charged through a gas charging check valve 64 which extends through the bottom support cup 62.

The normal unloaded riding condition of the device is shown in FIG. 2, and minimal shock loads are absorbed by the gas bag or air spring 21 in cooperation with mechanical spring 16. There will naturally be some up and down axial movement of the rod 22, but there is no action by the accumulator until the lower end of the manifold 25 is presented to the transfer passage 24. At such times, oil in the pump chamber 43 will be alternately in a state of compression and relaxation, with oil always flowing to the chamber 15C through the inlet check valve 44 during the downward stroke of rod 22 and flowing into pump chamber 43 during the upward stroke of rod 22.

When the load on the chassis is of such order as to cause the rod or tube 22 to transverse the distance separating transfer passage 24 and the lower end of manifold 25, the accumulator chamber 15C is opened and hydraulic fluid is charged into chamber 17 afforded between the opposed end walls of the cylinder 10 and the piston 11, forcing cylinder 10 upward independently of piston 11 such as to restore the chassis to the curb position shown in FIG 1. Concurrently the pump rod 22 moves upwardly, enlarging the pump chamber 43 and filling it with makeup oil drawn from the reservoir 19B; at the same time, chamber 17 is enlarged, FIG. 1, characterizing the upward, restoring travel of cylinder 10. When the load is removed, spring 16 expands or restores from the FIG. 1 position to the FIG. 2 position. Thus the piston 11 and cylinder 10, upon removal of the load, together move upwardly; rod 22 is carried along. There is some overtravel, such that the check valve 36 will be free of the upper end of tube 23, whereupon excess oil escapes through valve 36 into the oil reservoir 37, and eventually (under no load conditions) the parts assume the static condition, FIG. 2. It will be observed that oil reservoirs 19B and 37 communicate through open ports 66.

To generate a concept of size, dimension D, FIGS. 1 and 2, is 12.38 inches, the parts being drawn to scale.

Hence, while I have illustrated and described a preferred form of the invention, it is to be understood that this is capable of variations and modification.

I claim:

1. A combined shock absorbing and load-leveling unit for a vehicle, to be interposed between the chassis member an an axle member thereof normally to maintain the chassis at a level of normal travel, and comprising, in terms of an upright position: a first cylinder having an end wall and a sidewall, a piston telescoped within the cylinder and also having an end wall and a sidewall, said end walls being spaced from one another to define a first chamber for liquid in which is also disposed a flexible gas container tending to maintain said end walls separated and constituting an air spring therebetween, said piston resting on one end of said second spring, the other end of said second spring being engageable with one of said members of the vehicle and the end wall of said cylinder being engageable with the other member of the vehicle so that downward movement of the chassis is accompanied by movement of the cylinder and the piston against the resistance of and compressing said spring, an accumulator related concentrically to the piston adapted to confine a body of liquid under pressure, means for pressurizing the accumulator, means affording a transfer passage for transferring liquid under pressure from the accumulator to be delivered to said first chamber, a rod having a bore supported by said cylinder for movement therewith, the bore of the rod being closed at one end at the other end having an exit orifice in communication with said first chamber which accommodates the gas container, said rod having a manifold formed therein normally spaced from said transfer passage means by a predetermined distance but being placed in connection therewith when said distance is traversed by the rod as an incident to movement of said cylinder induced by a downward load on the vehicle chassis and an entrance orifice in the rod connecting the manifold with the rod bore whereby liquid under pressure flows from the accumulator to the bore of the rod for transfer to said first chamber tending to move the cylinder away from the piston and opposite to the load impressed thereon by the chassis when said distance is traversed as aforesaid, said second spring serving to restore the piston, cylinder and rod to return the chassis to normal level when the load on the chassis is removed.

2. A unit according to claim 1 in which the accumulator is defined by a flexible wall of sleevelike form and an inflexible wall together enclosing an accumulator chamber, said transfer passage being located in the inflexible wall, and said inflexible wall being in the form of a first tube i n spaced relation to said flexible wall.

3. A unit according to claim 2 in which a second tube surrounds said flexible wall in spaced relation thereto and define therewith an annular chamber for holding gas under pressure as the means for pressurizing the accumulator.

4. A unit according to claim 2 in which the rod occupies only a portion of the axial extent of the bore of said first tube, the unoccupied bore portion of said first tube constituting a pump chamber, the end of said rod which communicates with said pump chamber being in the form of a piston, said unit including a reservoir for liquid and said reservoir being in communication with said pump chamber by way of a first valve, a second valve communicating the pump chamber with the accumulator chamber, whereby a stroke of the rid in one direction, characterizing return movement imparted to the chassis, draws liquid through the first-named valve from the reservoir into the pump chamber and whereby a stroke of the rod in the opposite direction characterizing spring compression pumps liquid in the pump chamber through the second-named valve into the accumulator chamber.

5. A unit according to claim 4 in which the first-named piston is guided by a second cylinder spaced concentrically from said second tube which surrounds the flexible wall of the accumulator, the space thus afforded being a portion of said reservoir for the liquid.

6. A suspension unit according to claim 4 in which the bore of the rod has a relief valve allowing liquid in the rod bore to flow therefrom to said liquid reservoir, the relief valve in the rod being normally covered by a predetermined extend of said first tube which affords the in flexible wall of the accumulator and being uncoverable in the course of the rod traversing said predetermined extent of the tube when the rod moves in said direction thereby allowing excess liquid in the first chamber to flow to the liquid reservoir.

7. A unit according to claim 6 in which the accumulator chamber is provided with a relief valve communication with the liquid reservoir.

* * * * *